United States Patent
Stephane

(10) Patent No.: US 7,520,610 B2
(45) Date of Patent: Apr. 21, 2009

(54) PROCESS OF TREATMENT OF DATA WITH THE AIM OF THE DETERMINATION OF VISUAL MOTIFS IN A VISUAL SCENE

(75) Inventor: Alexandre-Lucas Stephane, Toulouse (FR)

(73) Assignee: Airbus, Blagnac (FR)

( * ) Notice: Subject to any disclaimer, the term of this patent is extended or adjusted under 35 U.S.C. 154(b) by 266 days.

(21) Appl. No.: 11/492,127

(22) Filed: Jul. 25, 2006

(65) Prior Publication Data
US 2007/0022376 A1 Jan. 25, 2007

Related U.S. Application Data

(60) Provisional application No. 60/714,264, filed on Sep. 7, 2005.

(30) Foreign Application Priority Data
Jul. 25, 2005 (FR) .................................. 05 07895

(51) Int. Cl.
 A61B 3/10 (2006.01)
 A61B 3/02 (2006.01)
 A61B 3/00 (2006.01)
(52) U.S. Cl. ...................... 351/205; 351/222; 351/237; 351/246
(58) Field of Classification Search ................ 351/205, 351/222, 237, 238, 246
See application file for complete search history.

(56) References Cited

U.S. PATENT DOCUMENTS 6,106,119 A * 8/2000 Edwards ...................... 351/209

OTHER PUBLICATIONS

Goldberg, Joseph H., et al. "Computer Interface Evaluation Using Eye Movements: Methods and Constructs" Engineering Information, Inc., New York, New York, XP002375287, International Journal of Industrial Ergonomics, vol. 24 (1999), pp. 631-645.

(Continued)

*Primary Examiner*—William C Choi
*Assistant Examiner*—Jack Dinh
(74) *Attorney, Agent, or Firm*—Oblon, Spivak, McClelland, Maier & Neustadt, P.C.

(57) ABSTRACT

The invention relates to a method for processing data representative of an interaction between a user (12) and his work environment (14), characterized in that it includes the following steps:

acquisition (E1) of data representative of the position in the course of time of the user's gaze at visual elements of a visual scene forming part of his work environment, during the interaction between the user and at least one interface element of the work environment, acquisition of these data being achieved by an oculometric apparatus, processing (E3) of data acquired in this way in order to determine at least one visual pattern comprising a sequence of visual elements and occurring on several occasions in the course of time.

22 Claims, 7 Drawing Sheets

OTHER PUBLICATIONS

Hayashi, Miwa "Hidden Markov Models to Identify Pilot Instrument Scanning and Attention Patterns" Department of Aeronautics and Astronautics, Massachusetts Institute of Technogy, Cambridge, MA, (2003), XP010668058, pp. 2889-2896.

Basset, M., et al. "Automatic Region of Interest Tracking for Visual Characterization of the Driver's Behaviour" Intelligent Vehicles Symposium, University of Parma, Italy, Jun. 14-17, 2004, XP010727492, pp. 335-338.

Popieul, J-C, et al. "Automatic Processing of a Car Driver Eye Scanning Movements on a Simulated Highway Driving Context", Intelligent Vehicles Symposium, Dearborn, Michigan, Oct. 3-5, 2000, XP002375426, pp. 13-18.

* cited by examiner

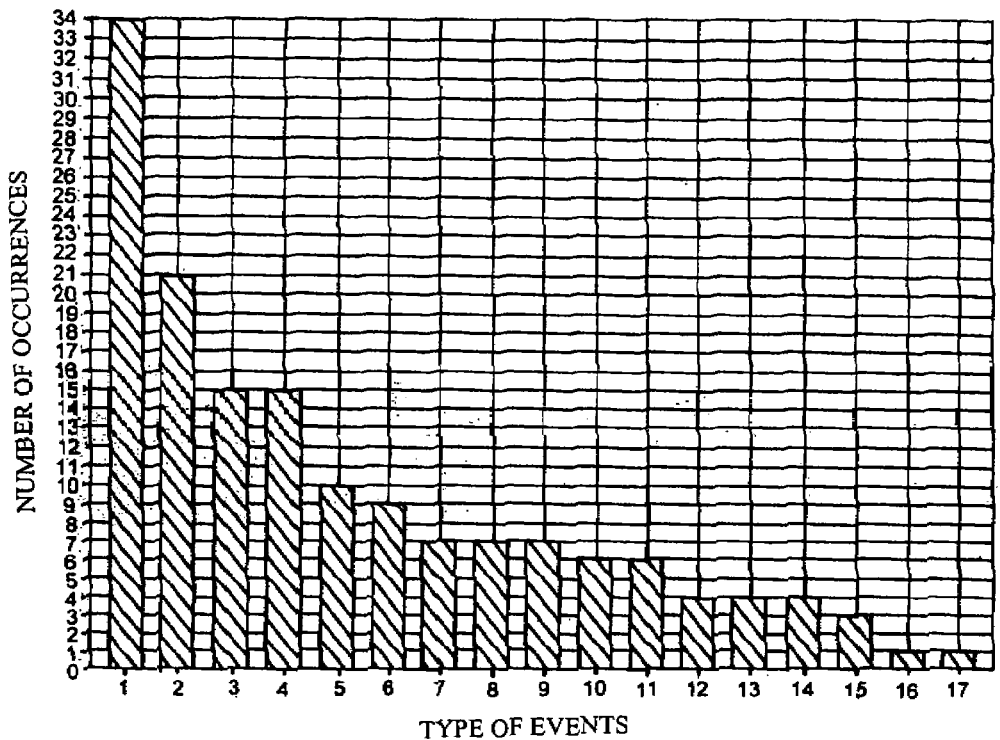

1 END OF FLIGHT PATH
2 PEAKS AT THE BACK RIGHT
3 FLIGHT PATH
4 VALLEYS AT THE BACK LEFT
5 PEAKS AT THE BACK LEFT
6 VERTICAL FLIGHT PATH SUPPORT LINES
7 AIRPLANE ICON
8 HEADING SCALE
9 ZOOM (AT BOTTOM RIGHT)
10 DISPLAY BAR
11 VALLEYS AT THE BACK RIGHT
12 PEAK AT THE MIDDLE RIGHT
13 FLIGHT PATH PROJECTED ON THE GROUND
14 BREAK POINT OF THE FLIGHT PATH
15 LADDER SCALE
16 PROJECTION OF THE AIRPLANE ICON ON THE GROUND
17 PEAKS AT THE MIDDLE LEFT

Fig.5

PROCESS OF TREATMENT OF DATA WITH THE AIM OF THE DETERMINATION OF VISUAL MOTIFS IN A VISUAL SCENE

The invention relates to a method and a system for processing data representative of an interaction between a user and his work environment.

In different sectors (aeronautics, space, automobile, maritime, etc.), the interaction of a user operating an air, space, terrestrial or maritime vehicle with his environment on board the vehicle has been closely examined, from both the human and machine aspects, in order to improve, for example, the interface between the operator and his on-board environment (instrument panels, etc.) or the operating procedures (such as flight procedures in an airplane).

Thus studies are undertaken to improve the ergonomics of this interface with the concern of comfort and safety for the user and likewise of safety for the passengers being transported.

For example, attempts are made to improve the interface elements of the instrument panel of the vehicle (such as the control and navigation instruments in an aircraft), in order that they provide the pilot with more information, with information presented more ergonomically and with more reliable information, while generating the minimum possible fatigue and stress in the pilot.

In this context of studying the interaction between the operator and the on-board environment of the vehicle, or more generally the interaction between a user and his work environment, it would be useful to have a new way of studying this interaction.

To this end, the present invention is aimed at a method for processing data representative of an interaction between a user and his work environment, characterized in that it includes the following steps:

acquisition of data representative of the position in the course of time of the user's gaze at visual elements of a visual scene forming part of his work environment, during the interaction between the user and at least one interface element of the work environment, acquisition of these data being achieved by an oculometric apparatus, processing of data acquired in this way in order to determine at least one visual pattern comprising a sequence of visual elements and occurring on several occasions in the course of time.

In this way, one or more visual patterns that occur repeatedly in the course of the scenario are determined on the basis of oculometric data collected on a user (such as a pilot) who is placed in interaction with at least one interface element of his work environment (such as a vehicle) in a scenario of use thereof.

Examples of visual elements of a visual scene are the interface elements of the work environment (such as interface elements of the instrument panel of a vehicle), zones of several of these elements and/or different zones of the same interface element and/or visual information (static or dynamic) furnished by the interface elements.

For an aircraft pilot, the visual elements may also encompass the exterior visual scene.

The visual pattern or patterns determined by the invention furnish information of great value that can be used, for example, in order to:

validate existing procedures for use of the vehicle (such as flight procedures in an airplane);

propose modes of use if identical patterns are determined in the majority of users;

evaluate the users;

discover modes of use of interface elements, such as instruments of the instrument panel, and of the vehicle, and of the information gathered on the exterior visual scene (taxiway, traffic signals, nearby vehicles, pedestrians, etc.);

understand better the results obtained with other methods of evaluation of the interaction between the user and interface and environment elements of the vehicle in general.

It will be noted that this qualitative processing of data can be performed with the sole objective of determining all visual patterns, regardless of what they are, or then particular visual patterns.

It is also possible to perform the qualitative processing to determine a visual pattern having one or more visual elements satisfying at least one predetermined criterion.

Thus, for example, it is possible to search in a navigation instrument of an aircraft for visual patterns comprising as visual element the future end of flight path of the aircraft.

According to one characteristic, the method includes a preliminary step of statistical processing of acquired data, and the step of processing the data in order to determine at least one visual pattern is performed as a function of the result of the statistical processing step.

This statistical processing makes it possible to sort the acquired oculometric data and in this way to facilitate the qualitative processing of the data, since this step is then performed on acquired data that have been processed statistically (quantitative processing).

The qualitative processing therefore involves a shorter computing time and reduced computing volume.

According to one characteristic, the step of statistical processing of acquired data furnishes the number of occurrences of some of the visual elements gazed at by the user in the course of time.

In this way the visual elements are sorted according to their importance and/or their interest for the user.

According to one characteristic, the processing of data in order to determine at least one visual pattern is performed on the basis of visual elements for which the number of occurrences is among the highest.

The statistical processing makes it possible to determine those visual elements of the visual scene that are gazed at most by the user in the scenario or the mode of use defined for his work environment, for example his vehicle.

It is also possible to achieve data processing on the basis of visual elements satisfying a different criterion.

According to one characteristic, the data acquisition step furnishes data on the user's visual behavior associated with at least some of the visual elements gazed at by the user in the course of time.

By taking into account the user's visual behavior during qualitative data processing, there is obtained a more refined visual pattern, because it contains a greater quantity of information.

It is in fact known how the user has gazed at one visual element or another, or in other words by fixation, saccade or pursuit. Thus it is possible to use the user's visual behavior (recorded by the oculometric apparatus) as a criterion for determining the importance of a given visual element compared with another visual element.

According to one characteristic, the data acquisition step is performed during a given time interval.

The data are collected over an observation time period during the evolution of a scenario or mode of use of the user's work environment, for example his vehicle or a computer screen.

According to one characteristic, the data acquisition step is performed during a scenario related to the progress of a given procedure for use of the user's work environment (for example, mode of use of a vehicle, screen or mobile phone).

The user (for example the pilot) is therefore placed in a given situation in order to evaluate his interaction with one or more interface elements of his work environment (such as the on-board panel of the vehicle) following an oculometric analysis.

According to one characteristic, the user is a vehicle operator interacting with the interface elements of an instrument panel of the vehicle. For example, if an airplane cockpit is modeled and the oculometric data are collected from the model prepared, the determination of visual patterns can then be used to validate/refine the model.

According to one characteristic, the vehicle is a motor vehicle.

The invention also has as an object a system for processing data representative of an interaction between a user and his work environment, characterized in that it includes:
- an apparatus for acquisition of oculometric data representative of the position in the course of time of the user's gaze at visual elements of a visual scene forming part of his work environment, during the interaction between the user and at least one interface element of the work environment,
- means of processing of data acquired in this way in order to determine at least one visual pattern comprising a sequence of visual elements and occurring on several occasions in the course of time.

This system exhibits the same aspects and advantages as those mentioned hereinabove with regard to the method, and they therefore are not repeated here.

Other characteristics and advantages will become apparent in the course of the description hereinafter, given solely by way of non-limitative example and referring to the attached drawings, wherein:

FIG. 5 is a histogram representing the number of occurrences as a function of the type of event appearing on the screen of FIG. 4;

Figure 4:
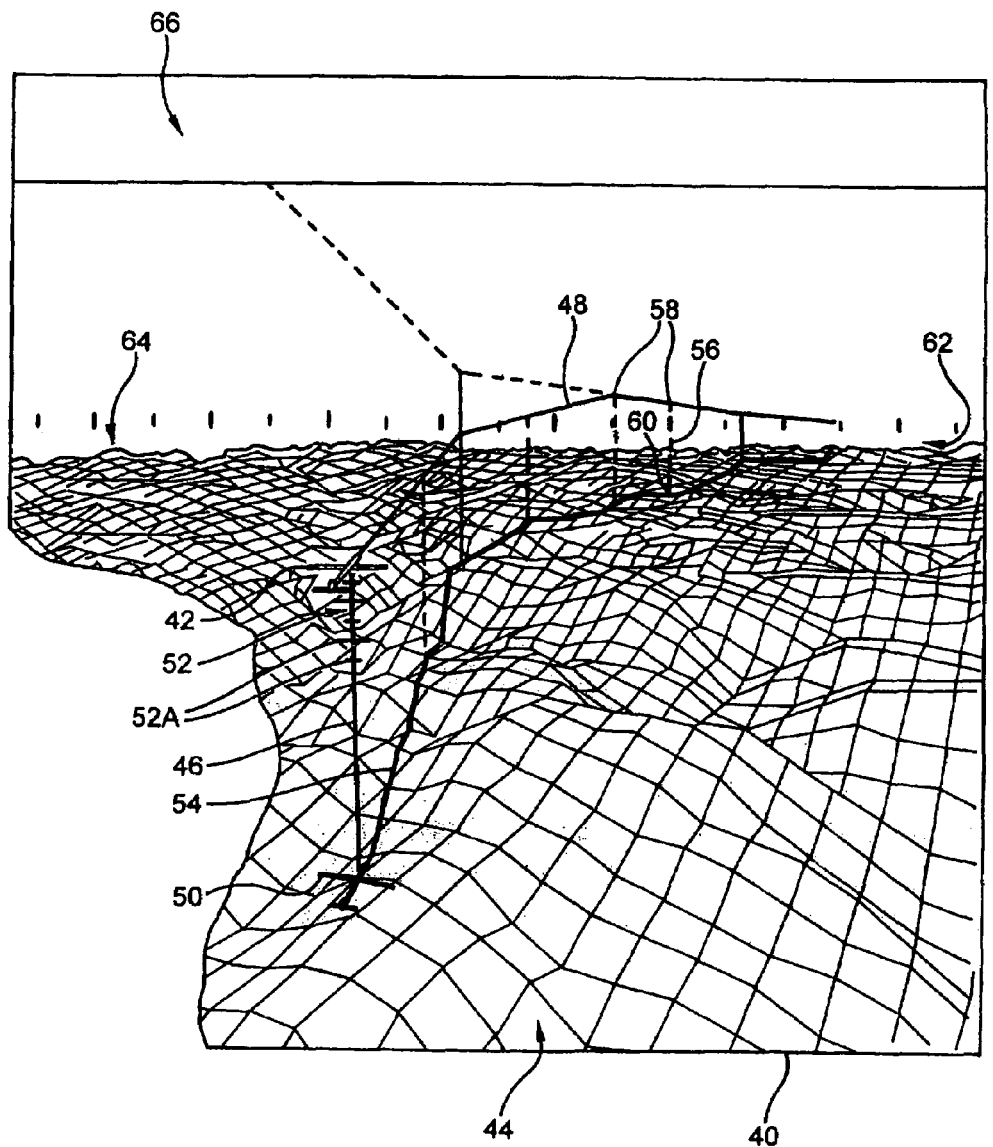
FIG. 4 is an example of a display screen to be used as basis for the practical examples of the preceding figures.
Figure 6:
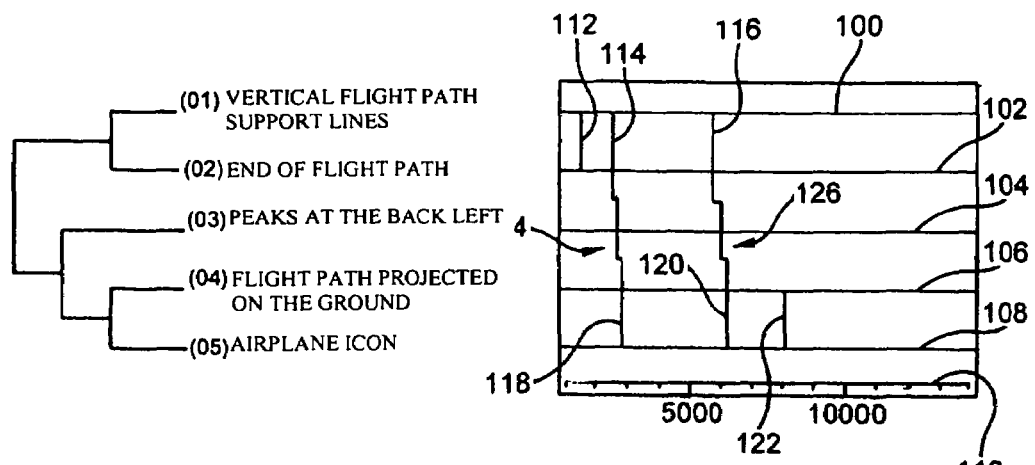
Figure 7:
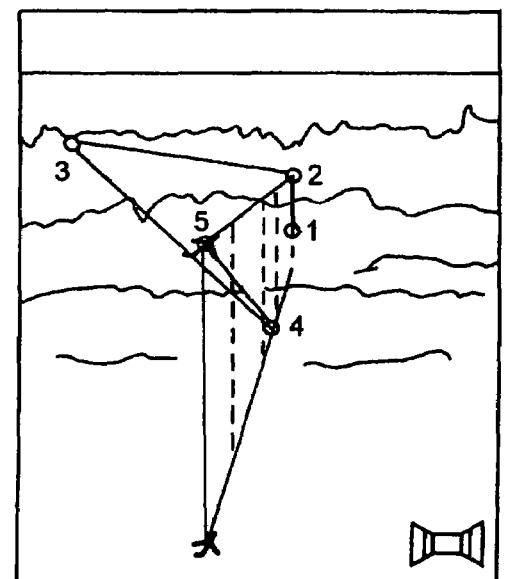
Figure 8:
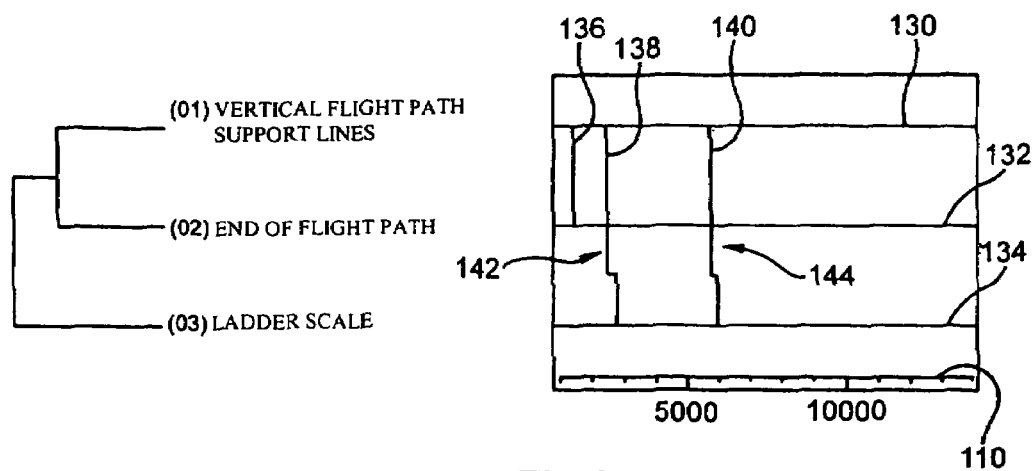
Figure 9:
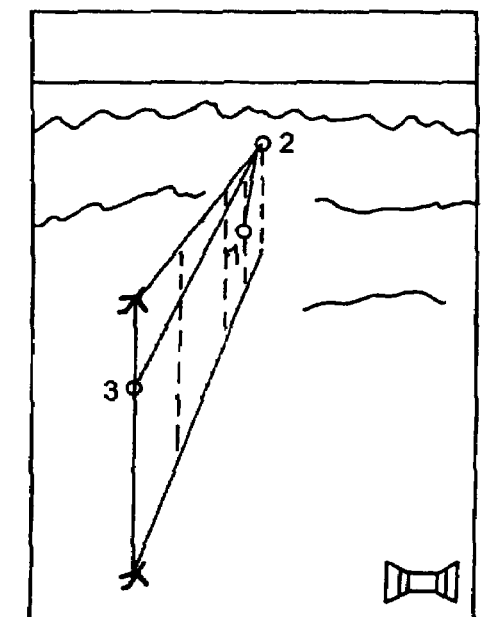
Figure 10:
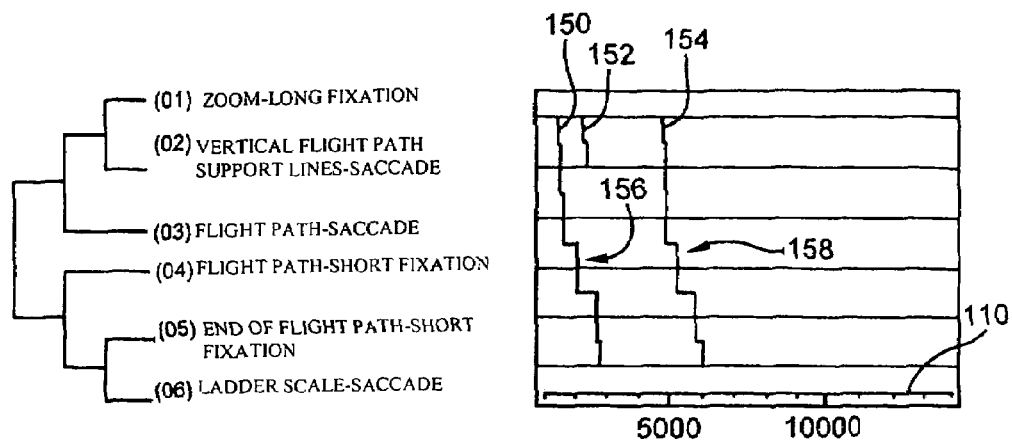
Figure 11:
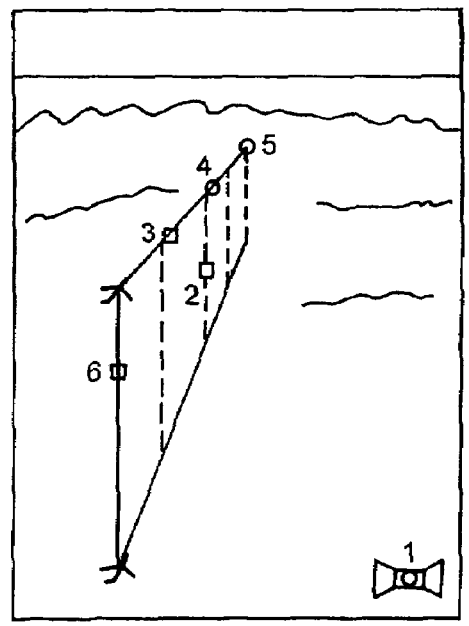

FIG. 6 schematically illustrates the detection of visual patterns;

FIG. 7 illustrates the schematic representation on the screen of FIG. 4 of a visual pattern detected in FIG. 6;

FIG. 8 schematically illustrates the detection of visual patterns (without visual behaviors);

FIG. 9 illustrates the schematic representation on the screen of FIG. 4 of a visual pattern detected in FIG. 8;

FIG. 10 schematically illustrates the detection of visual patterns with associated visual behaviors;

FIG. 11 illustrates the schematic representation on the screen of FIG. 4 of a visual pattern detected in FIG. 10.

The invention finds a particularly advantageous application in aircraft cockpits, for evaluation of the visual interactions between the pilot (user) and one or more on-board instruments (work environment) by acquisition and processing of oculometric data.

Figure 1:
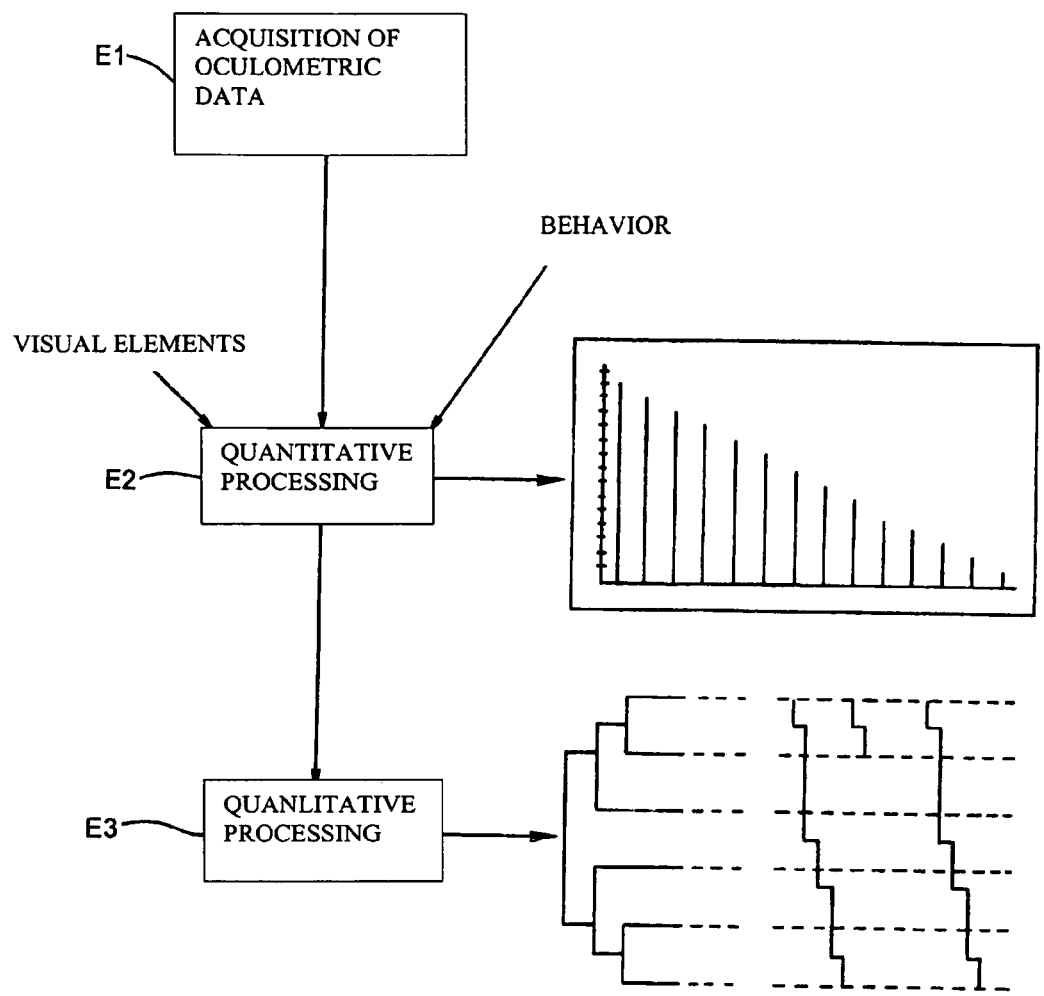
FIG. 1 represents an algorithm of the data processing method according to the invention.

A general algorithm of the method according to the invention is represented in FIG. 1 in three principal steps.

In the course of a first step E1, oculometric data are acquired by an oculometric apparatus, which will be described in detail later with reference to FIGS. 2 and 3.

These data reflect the position in the course of time of the pilot's gaze (eye movement) at visual elements of a visual scene forming part of the pilot's work environment, during the interaction of the pilot with one or more interface elements of an airplane cockpit.

More particularly, the acquisition of these data will make it possible to track the pilot's gaze as it moves over one or more on-board instruments of the cockpit and to identify the visual elements that held the pilot's attention. Later there will be described in more detail an example in which the oculometric data are representative of the position of the pilot's gaze moving over different visual elements of the same on-board instrument.

The algorithm of FIG. 1 includes a second step E2, in the course of which the previously acquired oculometric data are quantitatively processed.

This step, which may sometimes be omitted, makes it possible to perform statistical processing of the oculometric data by furnishing, in the form of histograms, for example, the number of occurrences of some of the visual elements or even of all of the visual elements gazed at by the pilot in the course of time.

Thus, for example, this statistical processing makes it possible to determine that the pilot has gazed at the airplane's flight path 56 times and at the projection of this flight path on the ground 15 times.

This processing is achieved, for example, by statistical sorting software known as "The Observer", distributed by Noldus Information Technology BV, Wageningen, the Netherlands.

More ample information concerning this software can be found on the website www.noldus.com.

As input for this software there are used the recorded oculometric data as well as the experimental protocol, or in other words the visual elements of the visual scene gazed at by the pilot and the pilot's visual behaviors, which are manifested, for example, by fixations, saccades or pursuits.

It will nevertheless be noted that it is not always necessary to take the pilot's visual behavior into account in the ensuing data processing.

It will be noted that, during step E2, the visual elements and the behaviors furnished to the quantitative processing module may also originate from a cognitive module established on the basis of the airplane cockpit.

The algorithm of FIG. 1 then includes a third step E3 of qualitative processing of data, either oculometric data acquired without the quantitative processing of step E2 or oculometric data acquired and processed quantitatively in the course of step E2.

The qualitative data processing makes it possible to determine, according to the predetermined criterion or criteria that are chosen, one or more visual patterns composed of a sequence of visual elements of the visual scene, these patterns repeating identically on several occasions in the course of a given time interval (observation period).

In this way it is possible, when preliminary quantitative processing is not performed, to attempt to obtain all the visual patterns that occur during the given time interval, without taking particular criteria into account.

It is nevertheless possible to determine the visual pattern or patterns containing one or more given visual elements, in order, for example, to evaluate the utility of information furnished to the pilot by an instrument while it is being designed.

When the result of statistical processing step E2 is taken into account, it is also possible to determine one or more visual patterns containing given visual elements, for example a visual element relating to the projection of the aircraft's flight path on the ground.

It is also possible to search for visual patterns containing visual elements having statistical significance.

Thus, for example, it is possible to search for the visual patterns containing the visual element that appears on the greatest number of occasions in the course of time (largest number of occurrences), or the two or three first visual elements corresponding to this definition.

It is also possible to choose to search for visual patterns containing visual elements having another statistical significance, such as those that are gazed at least often by the pilot.

The qualitative processing of step E3 can be implemented by a software program known as "Theme", distributed by the aforesaid Noldus Co.

This software is based in particular on an algorithm that searches for a sequence of events, beginning by searching for a first event in particular within a given time interval.

This software then provides for searching for the occurrence, in the course of this time interval, of a second event following the first event and occurring at a given time after the occurrence of the first event (in this way there is defined a second time interval shorter than the first time interval).

As soon as a pair of first and second events occurring within the second time interval has been identified, a similar search is launched for the occurrence of a third event in the course of the first time interval which also occurs after the second event, in a given time (third time interval) after the occurrence of the second event.

Thus a repetitive procedure is followed in order to identify sequences of events.

More ample information can be found in the article entitled "*Discovering hidden time patterns in behavior: T-patterns and their detection*" by Magnus S. Magnusson, Behavior Research Methods, Instruments & Computers 2000, 32(I), 93-I 10, pp. 93-110.

Preferably, the qualitative processing of step E2 is performed in several sub-steps:

1. search for visual patterns containing a visual element N obtained from the statistical processing (N=1, 2, 3, ... ); this search is performed on a single element at a time;

2. when these patterns are obtained, the following qualitative processing is performed:
   a) data relating to the visual behaviors are taken into account (enrichment of the database),
   b) among the visual patterns identified in the first step and including element N, the visual behavior is taken into account to search only for the pertinent patterns composed of elements N, M and R, the other patterns being considered, for example, as having little significance.

The different steps of the algorithm of FIG. 1 are implemented by data-processing means (central unit) in relation with the means for acquisition of data and for storage of these data (database, memory, etc.).

Figure 2:
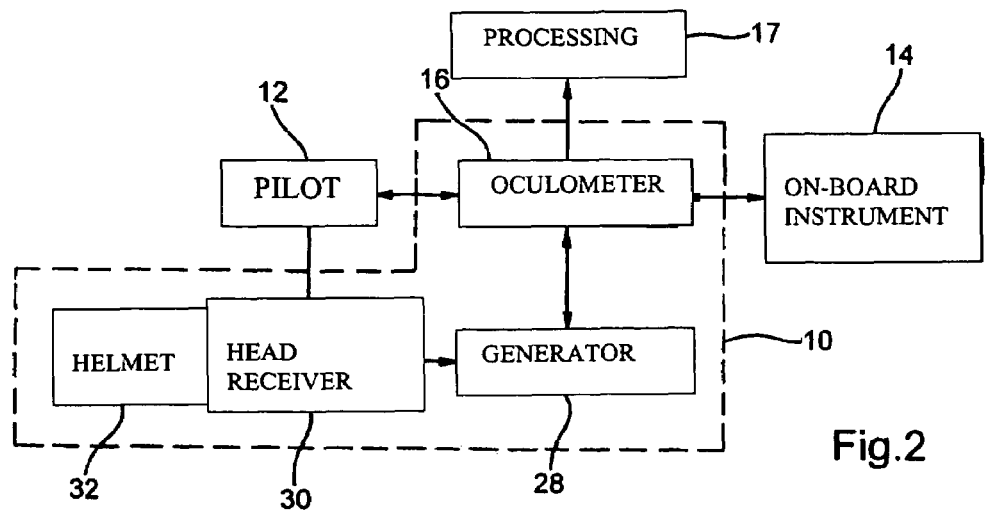
FIG. 2 is a schematic representation of the data processing system according to the invention.
Figure 3:
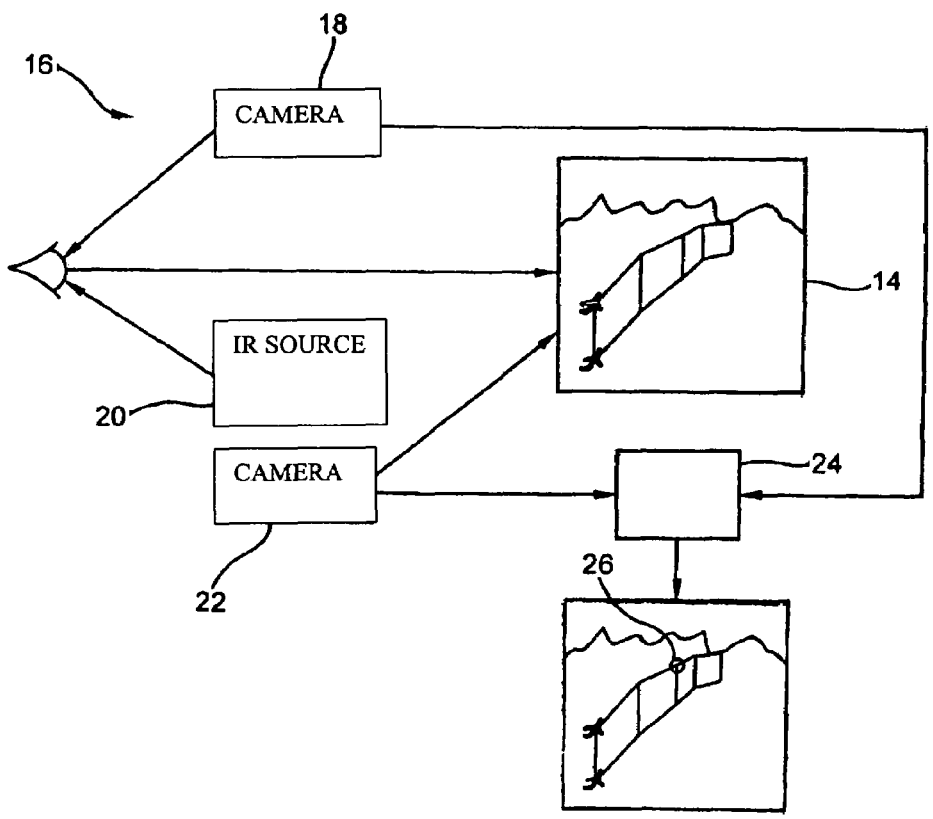
FIG. 3 is a schematic representation of oculometer 16 represented in FIG. 2.

As illustrated in FIGS. 2 and 3, oculometric apparatus 10 makes it possible to record the position of the gaze of pilot 12 at a visual scene, thus making it possible to follow the different visual elements traversed by the pilot's gaze at the interface elements of the cockpit, such as an on-board instrument 14, as well as at the external visual scene. This instrument will be described later with reference to FIG. 4.

Oculometric apparatus 10 includes an analog device 16, or in other words the oculometer, which records the movements of the pilot's eye and furnishes the oculometric data to processing means 17 mentioned hereinabove with reference to the description of FIG. 1.

The oculometer includes several components represented in FIG. 3, specifically a camera 18 to record the eye movements, an infrared source 20 emitting an infrared beam into the eye, and a camera 22 recording the visual scene viewed by the pilot.

Thus the video data acquired by camera 18 recording the eye movements and the video data acquired by camera 22 recording the visual scene viewed by the pilot are superposed by a video data processing unit 24, and the position of the pilot's gaze in real time is represented by a pointer 26 (such as a circle or a crosshair), which moves over the visual scene at which the pilot is gazing at the instant at which the recording is made.

The use of the oculometer alone, although sufficient for the external visual scene, does not provide sufficient precision if it is desired to record particularly fine details of the pilot's eye movement, for example reading of texts or gathering of information on specific zones of a screen, such as that of instrument 14.

A magnetic field generator 28 is therefore associated with the oculometer in order to impart maximum precision (FIG. 2).

Magnetic field generator 28 is used as a frame of reference in three-dimensional space to sense the position of the pilot's head relative to the coordinates of the different surfaces and planes that make up his real environment. In this regard, the surfaces and planes in question are those corresponding to the screens and to the control panels of the cockpit comprising regions of interest, which themselves can be broken down into zones and sub-zones of interest, as was seen hereinabove, for each interface element. The coordinates corresponding to these different surfaces and planes are measured and recorded in the 3D model of the pilot's environment.

To analyze the head movements of pilot 12, there are therefore used a magnetic field generator 28 and a receiver 30 fixed to the pilot's head by means of a helmet 32, and these components, in combination with the aforesaid analog device 16 (oculometer), make it possible to obtain maximum precision of the position of the user's gaze at the visual elements of a visual scene such as that appearing on on-board instrument 14.

More particularly, receiver 30 fixed to the pilot's head furnishes the exact position of the head in the three-dimensional model.

The distance between this head receiver 30 and camera 22 recording the scene, as well as the distance between head receiver 30 and the eyes of pilot 12, are then introduced into the three-dimensional model. The first of the aforesaid distances is necessary to achieve calibration of the camera relative to the scene, and the second of these distances is necessary to calibrate the analog device (oculometer).

It will be noted that the adaptation of the aforesaid oculometric apparatus 10 (FIG. 2) to the cockpit, in order to impart maximum precision by combination of data furnished by the position of the pilot's head and data furnished by the position of his gaze, takes into account the geometric study of the cockpit and the study of the posture of pilot 12.

While performing the geometric study of the cockpit, the Applicant noticed that, as regards installing magnetic field generator 28 on a support in the cockpit, it was advisable to ensure that the distance between generator 28 and every metal surface was sufficiently large to minimize the magnetic interferences that can be produced with the oculometric apparatus.

In addition, while configuring different components comprising oculometric apparatus 10 inside the cockpit, the Applicant found that the distance between magnetic field generator 28 and receiver 30 for the position of the pilot's head had to be strictly shorter than the distance between receiver 30 for the position of the pilot's head and any metal surface, again to reduce the magnetic interferences as much as possible.

It is appropriate to note that the postural study of pilot 12 makes it possible to define the limits of his volume of movement and therefore the distances between the head receiver and the magnetic field source.

By virtue of oculometric apparatus 10, it is possible to record very precisely the ocular movements (visual behaviors of the pilot), such as the fixations, saccades and pursuits that characterize the way in which the pilot gazes at the specific elements of an aeronautical visual scene (on-board instruments and exterior visual scene), such as that evolving on instrument 14.

The constituent components of oculometric apparatus 10, or in other words analog device 16, magnetic field generator 28 and a helmet 32 supporting head receiver 30 can be obtained from SensoMotoric Instruments GmbH, Warthestrasse 21, D-14513 Teltow, Germany.

More information can be found on the website www.smi.de.

On-board instrument 14 represented in FIGS. 2 and 3 has the form of a display screen, illustrated in greater detail in FIG. 4.

Screen 40 of FIG. 4 represents a three-dimensional synthetic image for visualization of the position of the aircraft and of the environment in which this aircraft is traveling.

This synthetic image is constructed according to a viewpoint external to the aircraft, and the display of this synthetic image on display screen 40 situated in the cockpit of the aircraft makes it possible to improve the knowledge that the pilot has of the actual situation of this aircraft.

This display screen can be a specific screen or a screen already present in the aircraft, such as a navigation screen of on-board instrument ND ("Navigation Display" in English).

In this synthetic image there are used several symbolic elements or icons: an icon 42 representing the aircraft (airplane icon) and indicating the location thereof, a representation 44 illustrating the terrain over which the aircraft is traveling, a vertical reference line 46 between icon 42 of the aircraft and its vertical projection on terrain 44, and a track 48 representing the future flight path of the aircraft.

Icon 42 is fixed in the three-dimensional image and provides the pilot with a continuous and immediate reference when the pilot's gaze is directed at display screen 40.

Terrain 44 is mobile and thus moves the relief around the aircraft mockup.

Icon 42 is representative of the real attitudes of the aircraft in roll, pitch and yaw. This information is qualitatively shown on this icon, which is inclined relative to the three axes.

The three-dimensional synthetic image also includes an icon 50 represented at the intersection of vertical line 46 and terrain 44, in order to permit visualization of the vertical projection of the aircraft on the terrain (projection of the airplane icon on the ground).

It will be additionally noted that vertical line 46 includes a scale 52 (ladder scale) composed of horizontal marks 52A placed on this vertical line in such a way as to indicate predetermined distances below the aircraft.

Screen 40 also shows as information a track 54 representing the vertical projection on terrain 44 of the future flight path 48 of the aircraft (flight path projected on the ground), a plurality of vertical lines 56 (vertical flight path support lines) between points 58 situated on track 48 representing the future flight path of the aircraft and the corresponding vertical projections 60 of these points on the terrain.

For example, points 58 correspond to the predicted position of the aircraft at different time or distance intervals.

It will be noted that the synthetic image also includes a heading scale 62 represented above horizon line 64.

Furthermore, the synthetic image includes supplementary information that is displayed, for example, on a display bar 66 provided on the display screen above the three-dimensional representation. This supplementary information can correspond in particular to the report of information normally displayed on a navigation display screen ND, such as wind (direction and strength), speed of the aircraft, next route point, etc.

Further details concerning the synthetic image represented in FIG. 4 can be found in European Patent Application 1460384.

Examples will now be presented to illustrate steps E2 and E3 of the algorithm of FIG. 1, respectively concerning the quantitative processing and qualitative processing of data received by the oculometric apparatus represented in FIGS. 2 and 3, for a pilot gazing at a scenario evolving on the on-board instrument represented in FIG. 4.

According to the envisioned scenario, the pilot is placed in the context of a scenario associated with the progress of a flight procedure corresponding to an approach phase in a mountainous region.

The pilot gazes at the scenario evolving under his eyes on the synthetic image of the type represented in FIG. 4, and the oculometric apparatus records the movement of the pilot's eyes over the synthetic image during a given time interval corresponding to the time of evolution of the scenario.

This time interval has a duration equal, for example, to 15 minutes.

By inputting the envisioned scenario as well as the different visual elements or events appearing on the synthetic image of the on-board instrument under consideration into the quantitative data-processing software (step E2 of FIG. 1), it is possible to achieve a statistical analysis of the oculometric data acquired by oculometric apparatus 10, and the results of this statistical analysis are illustrated in FIG. 5 in the form of a histogram representing the number of occurrences or appearances of each of the 17 indicated events.

Each of these events corresponds to a visual element of the visual scene, which has evolved under the pilot's eyes and at which the pilot has directed his gaze.

This processing makes it obvious which statistical elements are the most significant and which are the least significant and in particular, it shows that the element gazed at most of all by the pilot, or in other words the element considered by the pilot to be the most important during evolution of the visual scene, is the end of flight path, since it appears 34 times in the course of the observation time interval.

The visual element corresponding to peaks at the back right is the event occupying second place in order of importance for the pilot, since it appears 21 times in the course of the observation period.

The importance attributed to these first two elements is explained by the fact that, in the scenario under consideration, the airplane is scheduled to land in a mountainous region that, in the synthetic image, is situated at the back right relative to the represented flight path of the airplane.

It is also noted on the basis of the results of this statistical processing that the visual elements or events numbered 16 and 17 are in last position, with the same number of occurrences, and respectively concern the projection of the airplane icon on the ground and the peaks at the middle left.

After a statistical analysis of the visual elements of the visual scene at which the pilot has directed his eyes has been completed, step E3 of FIG. 1 is then initiated to perform qualitative processing of the data previously processed statistically.

In this way a search has been made for those structured sequences of visual elements of the visual scene that repeat identically at least one time during the observation time interval (visual patterns).

To the extent that statistical information and, more particularly, information on the importance attributed to events by the pilot is available, it is possible to perform a search for these structured sequences or successions of visual elements (visual patterns) on the basis of the detected importance for certain visual elements.

It is also possible to search for one or more visual patterns involving visual elements that satisfy a criterion other than the importance of the visual element under consideration, for example, the pertinence of colors in the gathering of information.

During the qualitative data processing, the results of which are illustrated in FIGS. 6 and 7, the pilot's visual behavior was not taken into account, and the determined visual patterns are therefore considered to be simple patterns.

For example, in FIG. 6, there are represented the different visual elements or events that should be found in the sought visual pattern or patterns.

These are the following elements:
vertical flight path support lines,
end of flight path,
peaks at the back left,
flight path projected on the ground,
aircraft icon.

The paired elements correspond to sub-patterns found by the qualitative processing software mentioned hereinabove.

It will be noted that the visual elements containing the end of flight path were first searched for with the qualitative processing software. Thereafter the processing was able to detect, in the course of the observation period, the successive occurrence of the event relating to the vertical flight path support lines and that relating to the end of flight path, with, as an additional constraint, the occurrence of the event relating to the end of flight path in a given time interval sufficiently short compared with the occurrence of the event relating to the vertical flight path support lines.

On the right part of FIG. 6, on parallel lines 100, 102, 104, 106, 108 disposed one above the other, dots were used to represent the occurrences of events considered in regard to each line compared with a time scale 110 expressed in tenths of one second by dots.

Thus the qualitative data processing reveals that one and the same visual pattern is repeated identically on three occasions, identified by references 112, 114, 116, in which the first event relating to the vertical flight path support lines is directly followed by the second event relating to the end of flight path.

Similarly, the qualitative data processing proceeds identically with the two events numbered 4 and 5, respectively relating to the flight path projected on the ground and to the airplane icon and in the course of the observation period under consideration, makes it possible to identify one and the same visual pattern, which is repeated on three occasions, identified by references 118, 120, 122, in which the flight path projected on the ground and the airplane icon appear successively.

By adding the last event relating to the peaks at the back left, which event must occur as a third element, after the vertical flight path support lines and the end of flight path (1 and 2) successively and before the successive events relating to the flight path projected on the ground and to the airplane icon (4 and 5), the qualitative data processing makes it possible to determine the visual pattern that is repeated identically on two occasions, identified by references 124 and 126. This pattern corresponds to a structured sequence or succession of visual elements that the pilot has gazed at twice in the course of the given observation period.

FIG. 7 represents the display screen of the type illustrated in FIG. 4 and which represents the synthetic image of the airplane during evolution of the scenario at which the pilot has gazed.

The synthetic image represented on screen 40 of FIG. 7 reveals the visual pattern 124 of FIG. 6 which occurs very rapidly in time, as can be judged according to time scale 110 of FIG. 6.

Thus the first event or visual element gazed at by the pilot in this pattern is element No. 1, representing the vertical flight path support lines situated at the back of the screen.

The second element gazed at is that of the end of flight path of the airplane, the third corresponds to the peaks at the back left, then the pilot's gaze is directed at the flight path projected on the ground (element 4) and finally returns to the airplane icon (element 5).

The visual pattern determined in this way is of length 5, since it involves five visual elements of the scene, whereas the level of this visual pattern, or in other words the number of hierarchical levels, is 3.

The hierarchical level of a visual pattern corresponds to the number of interlaced levels of sub-patterns present in this pattern and represented as follows:
Level 1: (a,b)
Level 2: (a (b,c))
Level 3: (a (b (c,d))), where (x, y) designates a pattern of level 1.

It will be noted that visual elements 1 and 2 form a visual sub-pattern of level 1, as do elements 4 and 5, and that the visual sub-pattern composed of the two elements 4 and 5 combined with visual element 3 forms a visual pattern of level 2.

The determination of such a visual pattern makes it possible, for example, to identify important aspects that must be taken into consideration during training of future pilots.

It is appropriate to note that, in the practical example described in the foregoing, the pilot's eye movement was followed over one and the same display screen, but it is also possible to conduct a similar procedure by presenting the pilot with a scenario requiring him to gaze at two or more on-board displays/instruments.

It is therefore possible, after having noted that the pilot's gaze moves incessantly back and forth from one display to the other, to envision the design of a new display combining the visual elements or events gazed at by the pilot in the course of these successive visual back-and-forth movements.

Referring to FIGS. 8 to 11, there will now be described another practical example that comparatively shows the results obtained when the pilot's visual behavior was not taken into account and when his visual behavior was taken into account.

In this example, the following visual pattern was considered:
vertical flight path support lines,
end of flight path,
ladder scale.

The visual pattern containing these visual elements was found by the qualitative processing software during the search for patterns that contain the end of flight path element, selected on the basis of the results of the preliminary statistical processing.

In a manner identical to that described with reference to FIG. 6, a time line has been represented opposite each of the visual elements or events, and the occurrence of each of these events has been represented, as a function of time scale 110, on corresponding lines 130, 132, 134.

The qualitative data processing was first applied to the data involving the two events relating to the vertical flight path support lines and to the end of flight path, in order to search for visual patterns comprising these two successive elements.

In this way the qualitative data processing made it possible to determine the three occurrences 136, 138 and 140 of the same visual pattern, indicated in FIG. 8.

In the qualitative data processing, the ladder scale event was then added, making it possible to identify two occurrences 142 and 144 of the same visual pattern, each composed of the succession in time of the following events or visual elements:
vertical flight path support lines,
end of flight path, and
ladder scale.

Visual pattern 142, which associates the successive chosen visual elements gazed at by the pilot in the course of the observation time interval, was then represented on display screen 40 of FIG. 9.

Visual pattern 142 recurs identically and shifted in time at 144.

It is noted that the determined visual pattern is of length 3 and of level 2, with a visual sub-pattern of level 1 (visual pattern 136), which occurs independently (outside pattern 142) one time.

In this first step of qualitative analysis, oculometric data corresponding to the pilot's visual behavior were not taken into account during processing, thus making it possible to find the simple visual patterns described in the foregoing.

In a second step, the data corresponding to the pilot's visual behavior (which can correspond, for example, to a saccade, to a long fixation or to a short fixation) are added, and the visual patterns that contain the visual elements of the previously found visual patterns are searched for.

FIG. 10 reproduces the results of qualitative processing applied to data constituting the events relating to the elements of a previously found pattern. These elements are the vertical flight path support lines, the end of flight path and the ladder scale.

By detecting visual patterns comprising the aforesaid visual elements, and by taking the pilot's visual behavior into account, there was obtained a greater volume of information, as proved by the left part of FIG. 10, which identifies the following visual elements or events, each assigned to the visual behavior in question:
zoom—long fixation,
vertical flight path support lines—saccade,
flight path—saccade
flight path—short fixation,
end of flight path—short fixation,
ladder scale—saccade.

When the database is enriched with the data representative of the pilot's visual behavior, the qualitative processing makes it possible to determine more complex patterns, occurring within the pattern of element-behavior pairs, comprising an element and a behavior, such as the pairs comprising flight path-saccade pair, for example.

By proceeding in a manner identical to that described with reference to the preceding figures, the qualitative data-processing software has searched for visual patterns comprising the first two visual elements, or in other words zoom + long fixation and vertical flight path support lines + saccade, in order to identify the same visual pattern 150, 152 and 154 and ultimately to achieve determination of two occurrences 156 and 158 corresponding to the same pattern that recurs identically in the course of time.

The complex visual pattern determined in this way associates, in structured manner, the six visual elements or events represented in FIG. 10.

Visual pattern 156 is illustrated in FIG. 11, solely in the form of numbers, each representing one visual element, so as not to overburden the diagram.

The circles indicate fixations, while the squares indicate saccades.

The visual pattern determined in this way is of length 6 and level 3, and it occurs in its entirety twice in time (patterns 156 and 158 of FIG. 10).

As regards visual sub-pattern 152 identified within the complex visual pattern, it occurs three times (150, 152, 154).

By adding the visual data relating to the pilot's visual behavior, there are therefore obtained visual patterns with richer information content. The pilot's visual behavior also makes it possible to determine his interest (long fixation) or his lack of interest in one visual element or another.

From the different visual patterns determined in the practical examples illustrated in FIGS. 6 to 11, it is possible to deduce potential improvements to the pilot-cockpit interface elements and to the procedures for using these interface elements (such as flight procedure, etc.), or it is possible to use them to teach the pilots to train themselves in the interface elements of the cockpit.

As an example, by determining one or more visual patterns characterizing the use of an instrument by the pilot, the invention makes it possible to determine at which instant a display system mounted high up above the pilot's head ("head up display" in English) should be used to optimize the use thereof. The invention also makes it possible to determine whether such a display system is actually being used by the operator in a particular type of vehicle.

In another example, the invention makes it possible to check that the operator is mentally constructing a three-dimensional visual representation of the position of his vehicle in space, and is doing so solely on the basis of two-dimensional information furnished by on-board instruments.

The invention can then be used as the basis or designing a new instrument that furnishes a three-dimensional visual representation of the position of the vehicle in space.

The invention is particularly advantageous for determining which information furnished by interface elements of the one-board panel is actually useful.

In fact, by virtue of the acquisition and qualitative processing of oculometric data, the invention makes it possible to separate information indispensable to the user from information that is not particularly useful or is even redundant.

In addition, the invention is applicable to other user-work environment pairs, such as an operator of a motor vehicle, of a locomotive or of a boat in interaction with an on-board panel, or else a user of a computer software program in interaction with a computer (screen, keyboard, etc.) on which it is running, or even a user operating his mobile telephone, etc.

By determining visual patterns that reflect how the user employs the interface element or elements of the vehicle, computer, mobile phone, etc., the invention therefore makes it possible to evaluate the user-work environment interaction and consequently to adapt the ergonomics of the user's job.

The invention claimed is:

1. A method for processing data representative of an interaction between a pilot and his work environment comprising at least one interface element of a cockpit of an aircraft, said method comprising the following steps:
    acquiring oculometric data representative of a position in the course of time of the pilot's gaze at visual elements of a visual scene forming part of his work environment, during an interaction between the pilot, and said at least one interface element of the cockpit of the aircraft,
    processing said oculometric data acquired so as to determine at least one visual pattern comprising a sequence of visual elements of the visual scene among different visual elements of said visual scene traversed by the pilot's gaze at said at least one interface element, said at least one visual pattern occurring on several occasions in the course of time.

2. A method according to claim 1, further comprising a preliminary step (E2) of statistical processing the acquired oculometric data, and wherein the step of processing the oculometric data so as to determine at least one visual pattern is performed as a function of the step of statistical processing.

3. A method according to claim 2, wherein the step of statistical processing the acquired oculometric data comprises providing a number of occurrences of at least some of the visual elements gazed at by the pilot in the course of time.

4. A method according to claim 3, wherein the processing of oculometric data so as to determine at least one visual pattern is performed on the basis of visual elements for which the number of occurrences is the highest.

5. A method according to claim 1, wherein the step of acquiring the oculometric data comprises providing data on the visual behavior of the user associated with at least some of the visual elements gazed at by the user in the course of time.

6. A method according to claim 1, wherein the step of acquiring the oculometric data is performed during a given time interval.

7. A method according to claim 1, wherein the step of acquiring the oculometric data is performed in a context of a scenario related to a progress of a given procedure of use of the pilot's work environment.

8. A method according to claim 1, wherein said acquiring oculometric data comprises acquiring video data from a first camera that records eye movements of the pilot, emitting an infrared beam into an eye of the pilot, and acquiring video data from a second camera that records the visual scene viewed by the pilot, and
    wherein said processing comprises superposing video data acquired by said first and second cameras.

9. A method according to claim 8, wherein said acquiring oculometric data further comprises sensing a position of the pilot's head relative to screens and control panels of said cockpit with a magnetic field generator and a receiver fixed to a helmet on the pilot's head.

10. A method according to claim 9, wherein said acquiring oculometric data further comprises placing said magnetic field generator relative to said receiver such that a first distance between said magnetic field generator and said receiver is shorter than a second distance between said receiver and any metal surface of said cockpit.

11. A method according to claim 1, wherein said processing comprises determining, based on said at least one visual pattern, visual elements that held the pilot's attention.

12. A method according to claim 1, wherein said processing comprises determining, based on said at least one visual pattern, a level of importance of at least one of the visual elements compared to another one of said visual elements.

13. A method according to claim 1, wherein said visual elements includes at least a portion of said interface element of said cockpit of said aircraft.

14. A method according to claim 13, further comprising a step of validating flight procedures for said aircraft based on said at least one visual pattern.

15. A method according to claim 13, further comprising a step of evaluating said pilot based on said at least one visual pattern.

16. A method according to claim 13, further comprising a step of determining modes of use for said at least one interface element of the cockpit based on said at least one visual pattern.

17. A system for processing data representative of an interaction between a pilot and his work environment comprising at least one interface element of a cockpit of an aircraft, said system comprising:
    an apparatus for acquisition of oculometric data representative of the position in the course of time of the pilot's gaze at visual elements of a visual scene forming part of his work environment, during the interaction between the pilot, and said at least one interface element of the cockpit for the aircraft,
    means for processing the acquired oculometric data and for determining at least one visual pattern comprising a sequence of visual elements of the visual scene among different visual elements of said visual scene traversed by the pilot's gaze at said at least one interface element, said at least one visual pattern occurring on several occasions in the course of time.

18. A system according to claim 17, wherein said interface element is a navigation instrument for said aircraft.

19. A system according to claim 17, wherein said apparatus for acquisition of the oculometric data comprises a first camera for recording eye movements of the pilot, an infrared source for emitting an infrared beam into an eye of the pilot, and a second camera for recording the visual scene viewed by the pilot.

20. A system according to claim 19, wherein said means for processing the acquired oculometric data comprises a video data processing unit that superposes video data acquired by said first and second cameras.

21. A system according to claim 20, wherein said apparatus for acquisition of the oculometric data comprises a magnetic field generator that senses a position of the pilot's head relative to screens and control panels of said cockpit.

22. A system according to claim 21, wherein said apparatus for acquisition of the oculometric data further comprises a receiver fixed to a helmet on the pilot's head.

* * * * *